T. W. Bartholomew,
Faucet.
No. 111,509.      Patented Feb. 7, 1871.
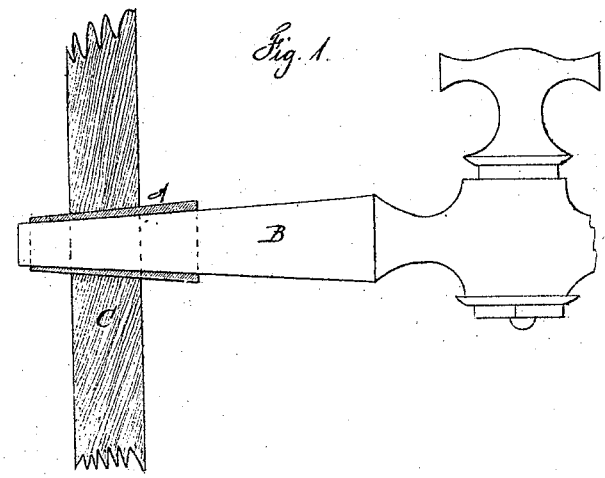
 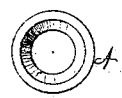
Witnesses,
G. R. M. Adams
Fred B. Van Kleck
Thos. W. Bartholomew

United States Patent Office.

THOMAS W. BARTHOLOMEW, OF NEW YORK, N. Y.

Letters Patent No. 111,509, dated February 7, 1871.

IMPROVEMENT IN FAUCETS.

The Schedule referred to in these Letters Patent and making part of the same.

*To all whom it may concern:*

Be it known that I, THOMAS W. BARTHOLOMEW, of the city, county, and State of New York, have invented a new and improved Faucet for Drawing Beer; and I do hereby declare that the following is a full, clear, and exact description, of the same, reference being had to the accompanying drawing forming a part of this specification.

My invention relates to a bush or thimble, to be applied to a cock or faucet used in drawing liquids from casks, &c.

In the drawing—

Figure 1 represents a longitudinal section of my bush applied to a faucet and inserted in a keg;

Figure 2 is a longitudinal central section of the bush; and

Figure 3, an end view of the same.

The bush or thimble A is conical, truncated, and made of gradually increasing thickness from its smaller to its larger end, whereby it is adapted to be more easily inserted in a cask and better withstand the effect of the severe strain and compression incident to the operation.

I prefer to make the bush of rubber or similarly-elastic material.

I claim as new and desire to secure by Letters Patent—

As an article of manufacture, the conical, truncated rubber bush or thimble A, made of gradually-increased thickness from the smaller to its larger end, whereby it is adapted to be applied to a faucet, substantially as specified.

THOS. W. BARTHOLOMEW.

Witnesses:
FRED. B. VAN VLECK,
G. R. M. ADAMS.